United States Patent

Call

[15] 3,691,582

[45] Sept. 19, 1972

[54] MACHINE FOR CLEANING PRINTED CIRCUIT BOARD

[72] Inventor: Sterling Call, Millbrae, Calif.

[73] Assignee: Circuit Equipment Corporation, San Bruno, Calif.

[22] Filed: July 30, 1970

[21] Appl. No.: 59,635

[52] U.S. Cl. ..........................................15/77, 134/9

[51] Int. Cl. ............................................A46b 13/02

[58] Field of Search .............134/6, 9, 32; 15/77, 102

[56] References Cited

UNITED STATES PATENTS

| | | | |
|---|---|---|---|
| 1,953,352 | 4/1934 | Kranich | 15/77 |
| 1,982,356 | 11/1934 | Rutter | 15/77 |
| 2,310,541 | 2/1943 | O'Brien et al. | 15/77 X |
| 2,726,414 | 12/1955 | Lindquist | 15/77 X |
| 2,851,711 | 9/1958 | Stehling et al. | 15/77 X |
| 3,002,503 | 10/1961 | Bongiovanni | 15/77 X |
| 3,286,292 | 11/1966 | Smith et al. | 15/77 |
| 3,449,781 | 6/1969 | French et al. | 15/77 |
| 3,566,429 | 3/1971 | Hamilton | 15/77 |
| 1,617,756 | 2/1927 | Gray | 15/77 UX |

*Primary Examiner*—Morris O. Wolk
*Assistant Examiner*—Joseph T. Zatarga
*Attorney*—Flehr, Hohbach, Test, Albritton & Herbert

[57] ABSTRACT

Cleaning machine having a conveyor belt for transporting printed circuit beneath scrubbing brushes moving reciprocally along an orbital path. A fluid actuated ram urges the brushes against the boards with a pressure which remains constant regardless of variations in board thickness and brush wear. A sink is provided at one end of the belt, and rinsing and drying stations are provided at the other.

11 Claims, 10 Drawing Figures

INVENTOR
STERLING CALL

BY Flehr, Hohbach, Test, Albritton & Herbert
ATTORNEYS

INVENTOR
STERLING CALL

BY

Fiehe, Hohbach, Test, Albritton & Herbert
ATTORNEYS

INVENTOR
STERLING CALL
BY Flehr, Hohbach, Test, Albritton & Herbert
ATTORNEYS

INVENTOR
STERLING CALL
BY Flehr, Hohbach, Test, Albritton & Herbert
ATTORNEYS

INVENTOR
STERLING CALL
BY Flehr, Hohbach, Test, Albritton & Herbert
ATTORNEYS

MACHINE FOR CLEANING PRINTED CIRCUIT BOARD

BACKGROUND OF THE INVENTION

This invention pertains generally to the manufacture of printed circuit boards and more particularly to a machine and method for scrubbing such boards.

In recent years, printed circuit boards have come into wide use in the construction of electronic equipment. Such boards generally consist of a plurality of conductive patterns formed on one or more of the planar surfaces of an insulative substrate member. These patterns are commonly formed by laminating a thin sheet of conductive material, such as copper, over one entire surface of the substrate member and then etching away the conductive material in all but the areas of the desired lead pattern. Holes are formed through the substrate member and the conductive patterns for receiving the leads of the electronic components mounted on the board. These leads are soldered to the conductive foil patterns to form the desired electronic circuits.

A problem exists in the manufacture of printed circuit boards since oxides and other foreign substances tend to form and collect on the surface of the conductive foils. Unless removed, these oxides and other substances will interfere with the soldering of component leads to the foil patterns. Heretofore, it has been common for the manufacturer to scrub the printed circuit boards manually in an effort to remove these oxides and other substances. Manual scrubbing is a costly and time consuming process, the results of which are largely dependent upon the skill of the person doing the scrubbing. When the boards are produced in large quantities, the problem is compounded.

Some attempts have been made heretofore to provide machines for scrubbing printed circuit boards. Such machines typically include brushes slidably mounted in straight ways to provide a reciprocal scrubbing action. While such machines provide some improvement over the manual scrubbing method, they have certain disadvantages. For example, the reciprocal action of the brushes in the ways deteriorates the performance of the machine and necessitates frequent replacement. The soaps commonly used for scrubbing printed circuit boards contain small abrasive particles, and these particles tend to collect in the ways, increasing the wear. In addition, the bristles of the brushes tend to wear, necessitating frequent adjustment of the brush position to maintain proper contact with the circuit boards. Likewise, the brushes must be adjusted to maintain proper contact with boards of different thicknesses. Furthermore, the machines of the prior art can only handle circuit boards having one dimension on the order of seven inches or greater. Thus, they cannot accommodate the smaller circuit boards which are most widely used.

There is, therefore, a need for a new and improved method and machine for scrubbing printed circuit boards which overcomes the foregoing and other disadvantages of the machines and the methods heretofore provided.

SUMMARY AND OBJECTS OF THE INVENTION

The cleaning machine of the present invention includes a conveyor belt for carrying printed circuit boards and a pair of scrubbing brushes mounted for reciprocal orbital movement in a direction generally perpendicular to the direction of travel of the conveyor belt. The brushes are urged against the circuit boards by means of a fluid actuated ram which maintains a constant pressure between the brushes and boards regardless of brush wear or the thickness of the boards. A sink is provided at one end of the conveyor belt, and rinsing and drying means are provided at the other end. The rinsing means includes a plurality of nozzles adapted for directing jets of water against both surfaces of the printed circuit boards. The drying means includes a plurality of rollers wrapped with absorbent materials for blotting the surfaces of the boards. The drying means also includes means for directing air against the surfaces of the boards.

It is in general an object of the present invention to provide a new and improved machine and method for cleaning printed circuit boards.

Another object of the invention is to provide a machine of the above character which includes brushes mounted for scrubbing the boards with a reciprocating orbital movement.

Another object of the invention is to provide a machine of the above character which includes means for automatically regulating the pressure between which the brushes and the boards.

Another object of the invention is to provide a machine of the above character which includes means for feeding boards through the machine from a stack of boards placed on a conveyor belt.

Another object of the invention is to provide a machine of the above character which includes means for rinsing and drying the boards.

Additional objects and features of the invention will be apparent from the following description in which one preferred embodiment is set forth in detail in conjunction with the accompanying drawings.

DESCRIPTION OF THE PREFERRED EMBODIMENT

Figure 1:
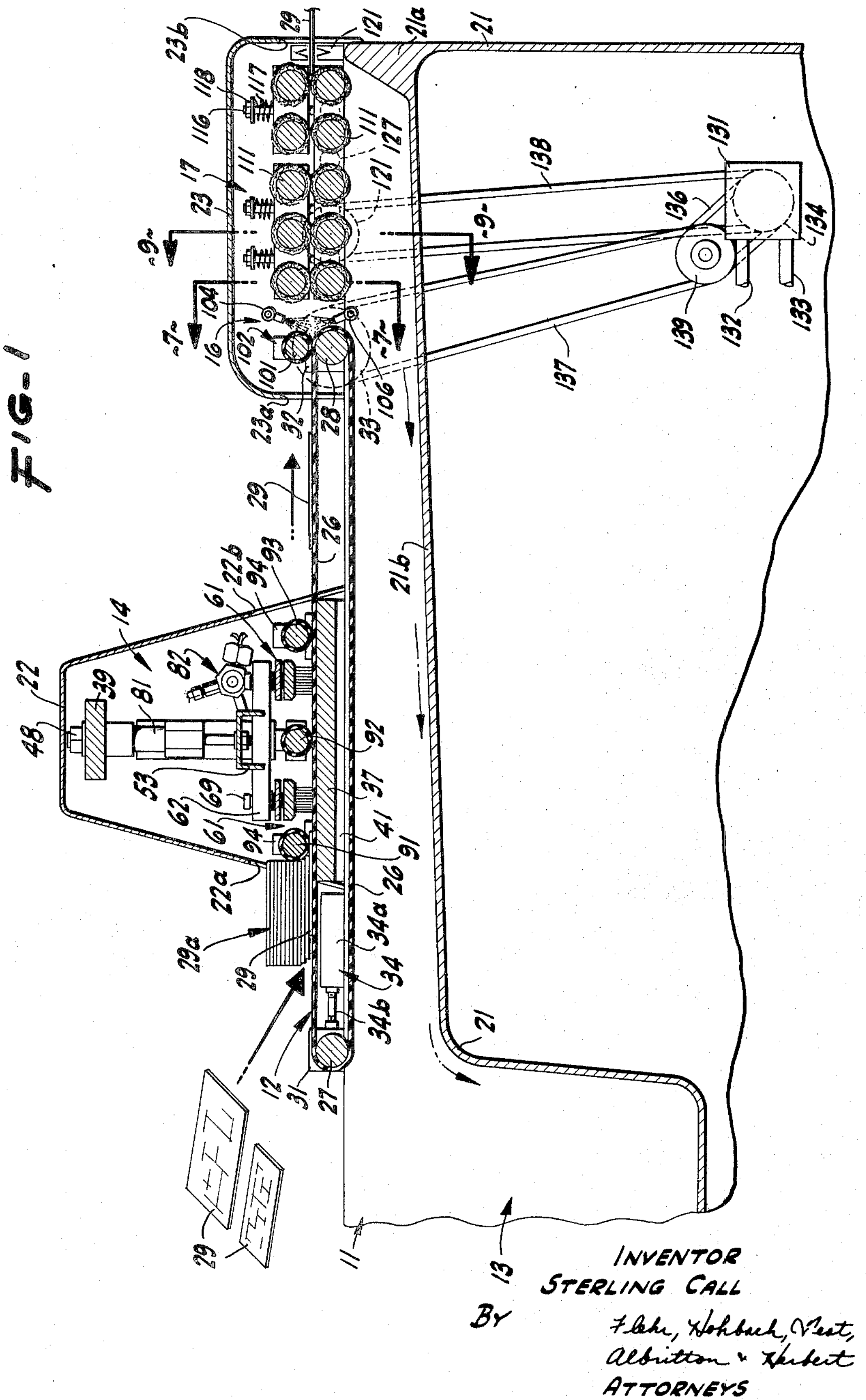
FIG. 1 is a front elevation view, partially sectioned, of one embodiment of the scrubbing machine incorporating the present invention.

In the preferred embodiment, the scrubbing machine includes a framework or body 11, conveyor means 12 mounted on the framework and adapted for carrying printed circuit boards during cleaning, a sink 13 at one end of the conveyor means, scrubbing means 14 disposed centrally of the conveyor means, and rinsing means 16 and drying means 17 supported by the framework at the end of the conveyor means opposite the sink.

The framework or body 11 comprises a unitary chassis or cabinet 21 formed of a material such as reinforced fiberglass. This cabinet or chassis includes an upper rail portion 21*a* which extends horizontally around the four sides of the cabinet to provide means for supporting the conveyor, scrubbing, rinsing, and drying means. The sink 13 is formed as a part of the chassis. The chassis also includes a drain shelf 21*b* which extends beneath the conveyor means, rinsing means, and drying means and extends downwardly toward the sink. Removable covers 22 and 23 are provided for the scrubbing means and for the rinsing and drying means, respectively. These covers are molded of fiberglass and formed to include openings 22*a*, 22*b* and 23*a*, 23*b* through which the conveyor means and circuit boards can pass.

Figure 2:
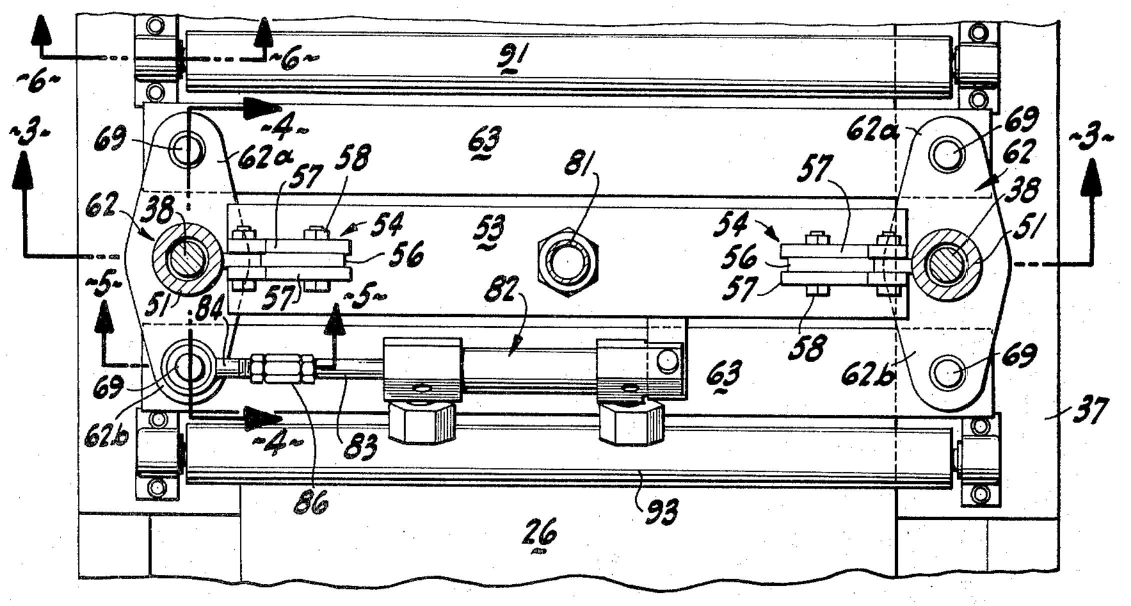
FIG. 2 is a top plan view of the scrubbing portion of the machine illustrated in FIG. 1.
Figure 3:
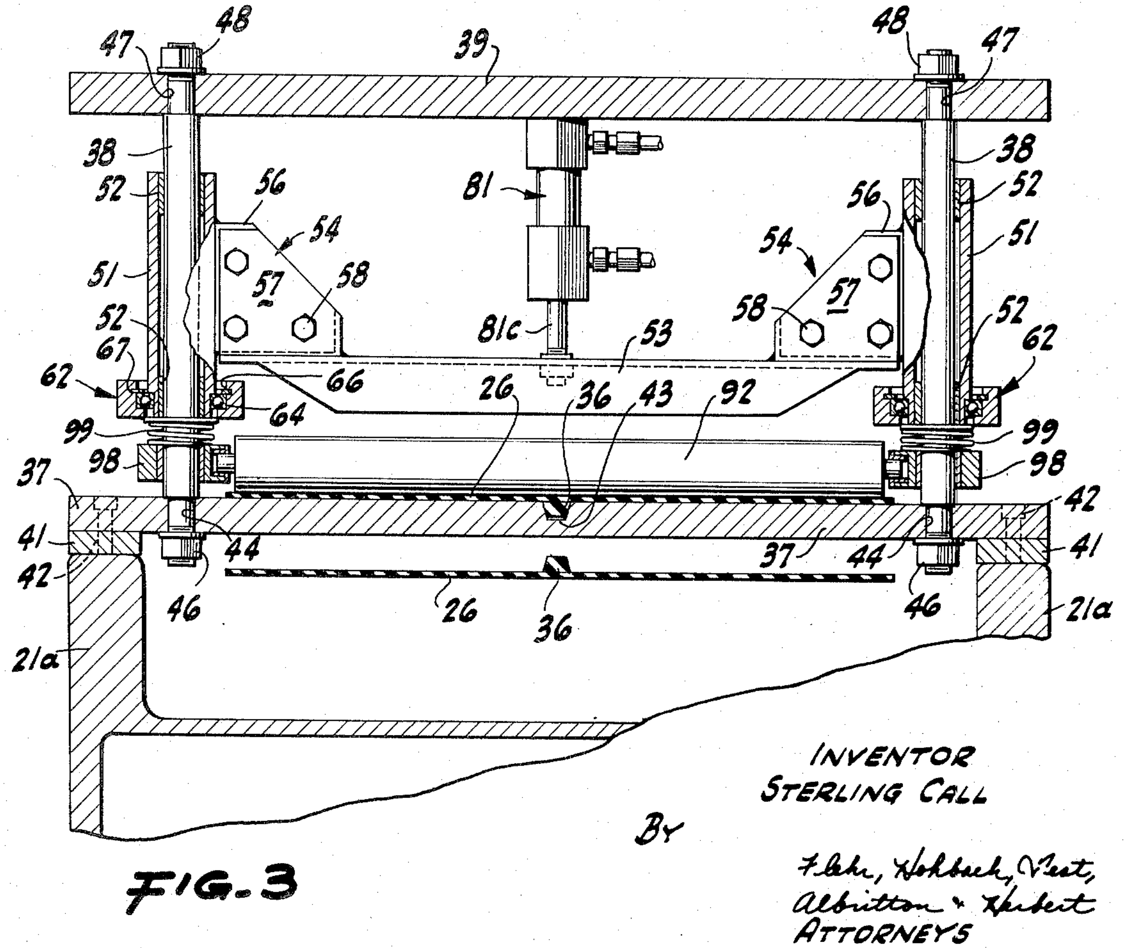
FIG. 3 is a cross-sectional view taken along the line 3—3 of FIG. 2.
Figure 4:
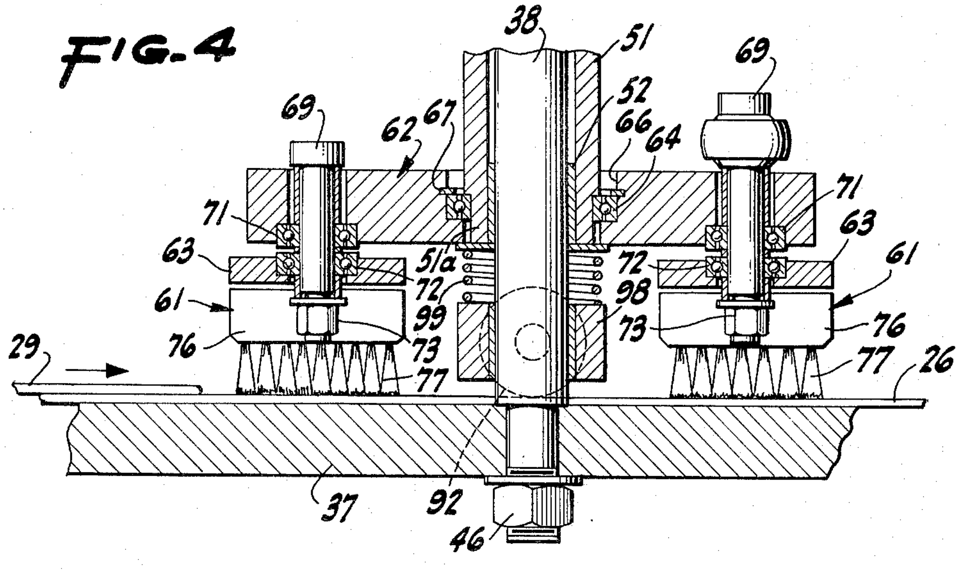
FIG. 4 is a cross-sectional view taken along the line 4—4 in FIG. 2.
Figure 5:
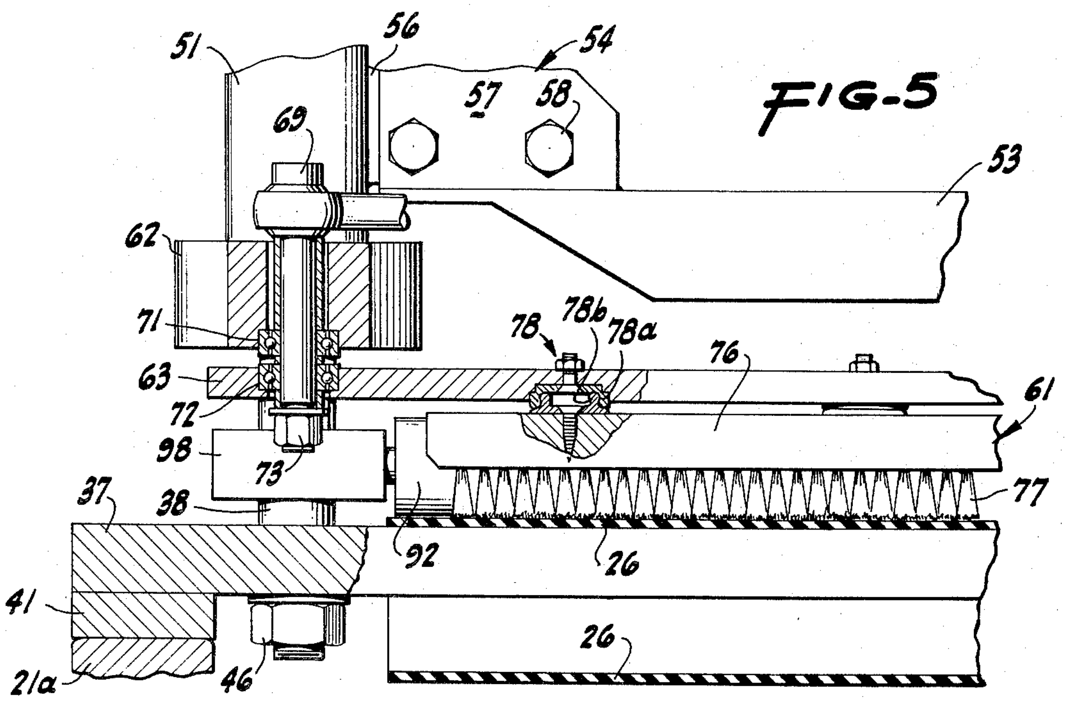
FIG. 5 is a cross-sectional view taken along the line 5—5 of FIG. 2.
Figure 6:
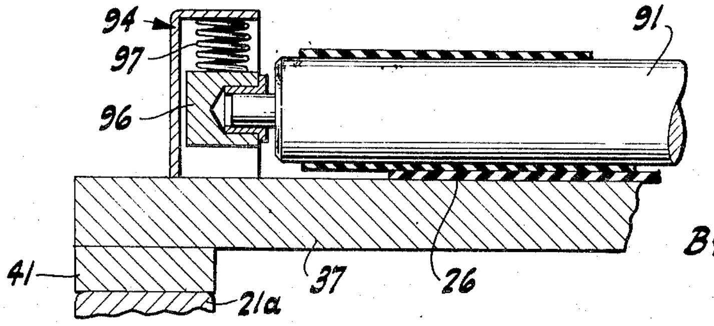
FIG. 6 is a cross-sectional view taken along the line 6—6 in FIG. 2.
Figure 7:
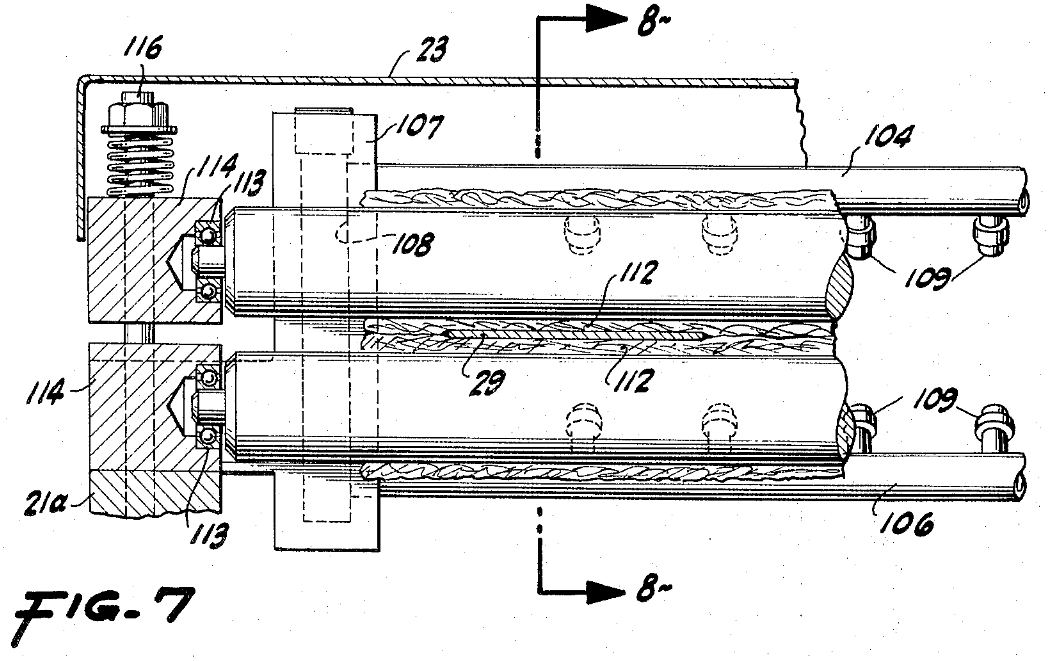
FIG. 7 is a cross-sectional view taken along line 7—7 in FIG. 1, illustrating the rinsing and drying portions of the machine.
Figure 8:
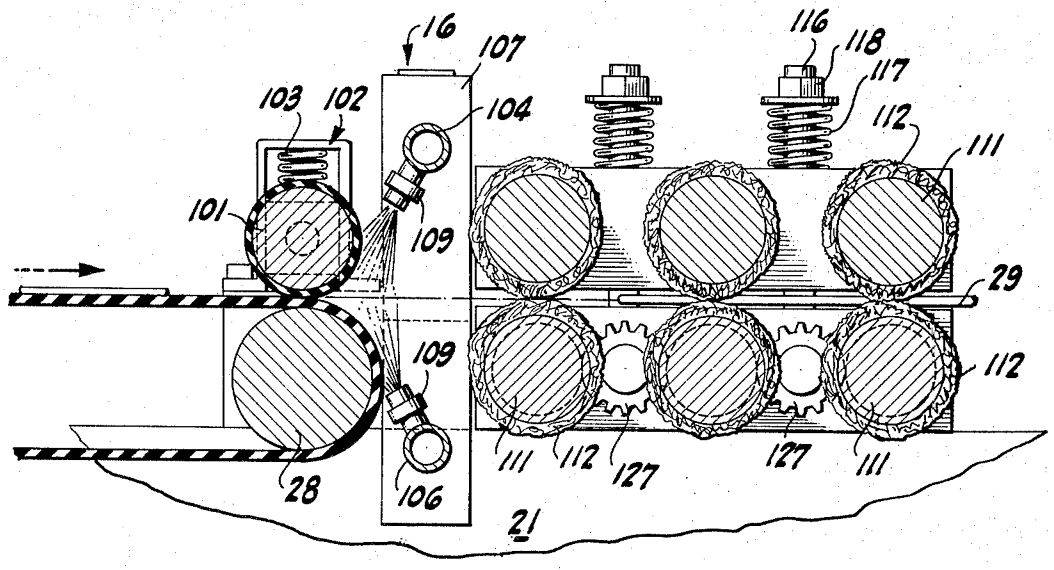
FIG. 8 is a cross-sectional view taken along line 8—8 in FIG. 7.
Figure 9:
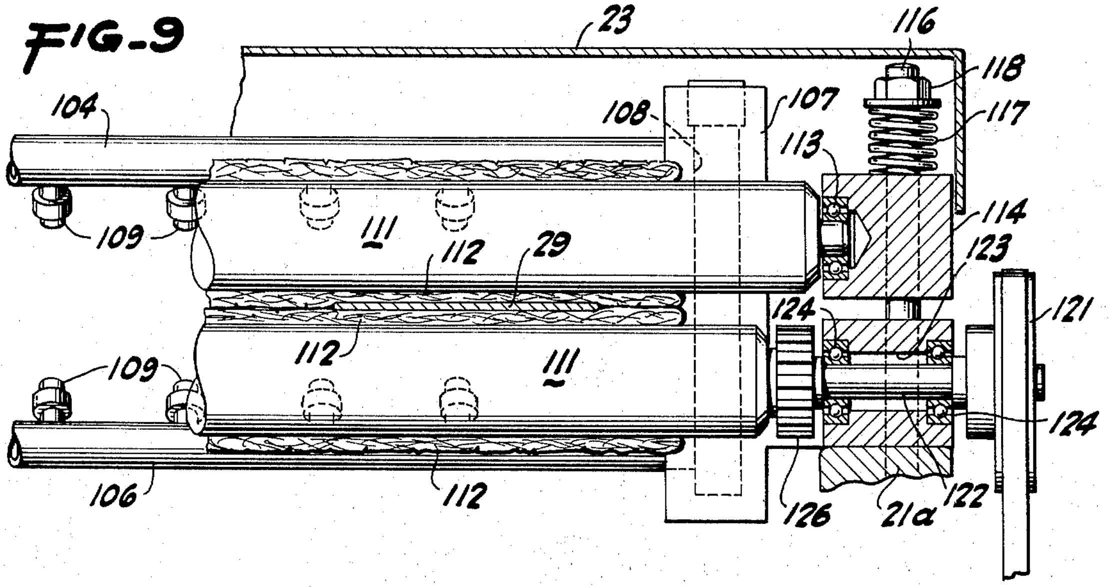
FIG. 9 is a cross-sectional view taken along line 9—9 in FIG. 1.
Figure 10:
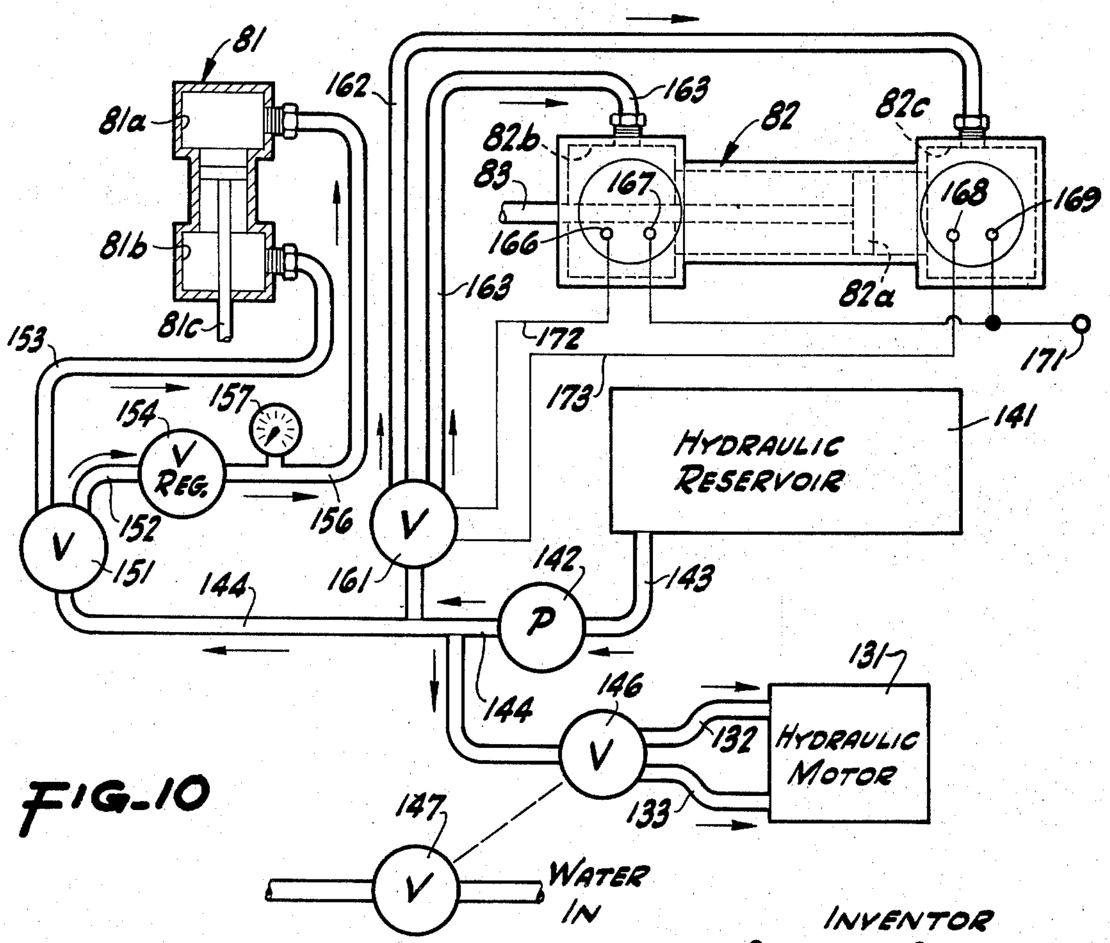
FIG. 10 is a schematic diagram of the fluid operating system of the embodiment illustrated in FIGS. 1–8.

The conveyor means 12 includes a conveyor belt 26 mounted on pulleys 27, 28. This belt is of the endless type and is adapted for receiving printed circuit boards such as indicated by the reference numeral 29, on its upper surface for transporting them in a direction lengthwise of the chassis 21. The belt has a width less than the width of the chassis, as can best be seen in FIGS. 2 and 3. It is fabricated of a rubberized material, such as neoprene, and is provided with a textured outer surface for gripping the circuit boards.

The pulleys 27 and 28 are rotatably mounted at their ends in bearing blocks 31 and 32, respectively. These bearing blocks are secured to the rail portions 21a of the chassis by conventional means such as bolts. The pulley 28 is adapted to be driven by means of a drive pulley 33 attached thereto, and the pulley 27 functions as an idler. Means is provided for adjusting the tension of the conveyor belt. This means includes a pair of tensioning units 34 each including a body portion 34*a* secured to the rail portion of the chassis and a screw portion 34*b* threaded into the body portions and engaging one of the bearing blocks 31 for adjusting the position of the pulley 27 longitudinally of the chassis.

Means is provided for preventing lateral slippage of the conveyor belt. This means includes a V-belt portion 36 formed on the inner surface of the conveyor belt and V-grooves formed in the pulleys 27, 28 for receiving the V-belt portion.

The scrubbing means 14 includes a framework comprising a base member 37, a pair of upright posts 38, and an upper frame member 39. The base member 37 rests upon spacer members 41 extending along the tops of the chassis rail portions 21a, and it is secured thereto by means of bolts 42. The base member 37 is positioned immediately beneath the upper span of the conveyor belt 26, and the inner surface of this belt slides across the upper surface of the base member. Thus, the base member is adapted for supporting the conveyor belt and circuit boards carried thereby during the scrubbing operation. The base member 37 is formed to include the longitudinally extending V shaped groove 43 adapted for receiving the V belt portion 36 of the conveyor belt.

The posts 38 are cylindrical members having upper and lower end portions of reduced diameter. The lower portions of the posts 38 extend through mounting holes 44 in the base member 37, and the posts are held in place by means of nuts 46 threadably mounted on their lower portions. The upper portions of the posts pass through bore holes 47 formed in the upper frame member 39. This frame member is secured to the post by means of nuts 38 threadably engaging the upper portions thereof.

A brush carrier is slidably mounted on the post 38 and adapted for vertical movement. This carrier includes a pair of cylindrical sleeves 51 slidably mounted on the posts 38 by means of bushings 52. A cross arm 53 having a U-shaped cross section extends between the sleeves 51 and is rigidly secured thereto by means of gusset plate assemblies 54. Each of these assemblies includes a generally triangular ear secured to one of the sleeves 51 and a pair of generally triangular ears 57 secured to the cross arm 53. The ears 56 and 57 are held together by means of bolts 58.

A pair of scrubbing brushes 61 is mounted to the lower portions of the sleeves 51 and adapted for reciprocating orbital movement by means of an assembly of pivot plates 62 and tie rods 63. The pivot plates are pivotally mounted on the lower portions on the sleeves by means of ball bearings 64 disposed in counter bores 66 formed in the pivot plates. The inner races of the bearings engage portions of reduced diameter 51a at the lower ends of the sleeves, and the bearing are retained in the counter bores by means of C-rings 67.

The pivot plates 62 each include a pair of oppositely disposed arm portions 62*a* and 62*b* to which the tie rods 63 are pivotally secured by means of pivot pins 69. These pivot pins pass through ball bearings 71 and 72 carried by the pivot plates and tie rods, respectively, and are retained in place by means of nuts 73 threadably mounted on their lower ends.

The brushes 61 include a rigid backing member 76 and a bristle portion 77. The backing members are removably secured to the tie rods. In the preferred embodiment, dot fasteners or snaps 78 are used for this purpose. Each of these includes a female portion 78a attached to the tie rods and a male portion 78b attached to the backing member. The use of snaps permits easy removal of the brushes when replacement is necessary. The bristle portion of the brushes can be fabricated of a conventional material such as tampico or bristles.

Means is provided for urging the brushes downward against the circuit boards on the conveyor belt. This means includes a fluid actuated ram 81 connected between the upper frame member 39 and the cross arm 53. In the presently preferred embodiment, this ram is hydraulically operated although, if desired, a pneumatic unit could be used. As is described more fully hereinafter, means is provided for regulating the pressure of the fluid supplied to the ram 81, thereby maintaining the pressure exerted by the brushes on the boards at a constant level regardless of the thickness of the boards or wearing the brushes.

Fluid actuated drive means is provided for moving the brushes 61 in a reciprocating orbital path generally perpendicular to the direction of travel of the conveyor belt 26. This means includes a reciprocating hydraulic motor 82 mounted on the cross arm 53. This motor includes a reciprocating armature member 83 which is connected to one of the pivot pins 69 by means of a connecting rod 84. The armature member 83 and connecting rod 84 are connected together by a sleeve 86 which, in effect, permits adjustments in the length of the connecting rod. If desired, a reciprocating pneumatic motor can be used in place of the hydraulic motor 82.

A plurality of hold-down rollers 91, 92 and 93 are provided for holding the circuit boards 29 in place as they pass beneath the brushes 61. The rollers 91 and 93 are positioned outside the brushes, and the roller 92 lies between them. The outside rollers 91, 93 are each rotatably mounted in a pair of spring loaded bearing assemblies 94 which are secured to the base member 37. Each of these bearing assemblies includes a floating bearing block 96 and a compression spring 97 for urging the block and roller mounted therein downward against the circuit boards and belt. The central hold-down roller 92 is rotatably mounted in a pair of bearing blocks 98 which are slidably mounted on the posts 38. Compression springs 99 constrained between the lower ends of the sleeves 51 and the blocks 99 urged the central roller downward against the circuit boards and conveyor belt.

An additional hold-down roller 101 is provided at the end of the conveyor belt adjacent the rinsing means. This roller is mounted in a pair of pairing assemblies 102, each including a bearing block and a compression spring 103 for urging the roller down against the circuit boards and conveyor belt. The bearing assemblies 102 are bolted to the rail portions **21*a* of the chassis, and the roller 101** facilitates the delivery of circuit boards from the conveyor belts to the rinsing and drying means.

The rinsing means 16 includes a pair of water conduits 104, 106 extending transversely of the conveyor belt 26. These conduits are supported at their ends by manifold assemblies 107 bolted to the chassis rail portions 21a. The manifolds 107 are formed to include internal passageways 108 in fluid communication with the interior of the conduits 104, 106. These conduits are provided with spaced apart spray nozzles 109 positioned for spraying rinse water on the upper and lower surfaces of circuit boards as they emerge from the conveyor means between the hold-down roller 101 and the belt pulley 28.

The drying means 17 includes two sections, a first section in which the circuit boards are dried by a blotting action and a second section in which the boards are dried by warm air.

The first section of the drying means includes a plurality of drying rollers 111 extending transversely of the chassis 21 and disposed in vertically aligned pairs. Water absorbent material, such as terrycloth, is wrapped around each of these rollers, as indicated at 112.

The drying rollers 111 are rotatably mounted in ball bearings 113 carried by bearing blocks 114. The bearing blocks for the lower rollers rest upon the rail portion **21*a* of the chassis and can be secured thereto by bolts. The upper bearing blocks are slidably mounted on studs 116 which extend upward from the chassis rail portion. Compression springs 117 are constrained between the upper blocks and nuts 118** threadably mounted on the upper portions of the studs. These springs provide means for urging the upper rollers down against the lower rollers, and the nuts provide means for adjusting the pressure between the rollers.

The lower rollers are driven by means of a drive pulley 121 mounted on the shaft 122 of one of them. This shaft extends through a bore hole 123 in the lower bearing block and is supported by a pair of ball bearings 124. Power is transmitted from the shaft 122 to the remaining lower rollers through a gear trained consisting of a spur gear 126 mounted on the shaft of each of the lower rollers and idler gears 127 rotatably mounted intermediate the spur gears 126. The upper drying rollers are driven by the rotation of the lower rollers and the circuit boards passing between them.

The second section of the drying means includes an air manifold 121 mounted on the rail portion **21*a* at the end of the chassis and positioned for directing warm air against the surfaces of circuit boards as they emerge from the last pair of drying rollers 111**.

Means is provided for driving conveyor belt and the drying rollers. In one presently preferred embodiment, this means includes a hydraulic motor 131 mounted toward the lower portion of the chassis. Alternatively, if desired, other conventional types of motors can be used instead of the hydraulic motor. The direction of rotation of the hydraulic motor is reversible, and ports 132, 133 are provided for receiving operating fluid. A pulley 134 having a plurality of grooves is mounted on the output shaft of motor 151, and power is transmitted from this pulley to the pulleys 33 and 121 by means of drive belts 136, 137 and 138. The belt 136 drives a tensioning pulley 139 which drives the pulley 33 through the belt 137. The tensioning pulley is pivotally mounted relative to the shaft of the motor 131 and provides means for adjusting the tension in the belt 137. The belt 138 extends directly between the pulley 134 and the pulley 121 of the drying means. The pulley 33 is provided with a larger diameter than the pulley 121 so that the conveyor blet 26 travels somewhat slower than the drying rollers 111. This difference in speed prevents stacking of boards at the discharge end of the conveyor belt and provides an efficient transfer of the boards from the belt to the drying rollers.

In the presently preferred embodiment, a hydraulic system is provided for operating the brush positioning ram 81, the reciprocating brush motor or ram 82, and the hydraulic motor 131. This means includes a hydraulic reservoir 41 containing a hydraulic fluid such as high viscosity oil. A pump 142 is provided for supplying fluid from the reservoir to the remainder of the system. The intake or suction side of the pump is connected to the reservoir by a hydraulic line 143. A hydraulic line 144 is connected to the discharge side of the pump. A motor control valve 146 is connected intermediate the pump 142 and the hydraulic motor 131 for controlling operation of the motor. This valve is adapted for selectively supplying fluid to the port 132 for driving the conveyor belt and drying rollers in a first direction and to the port 133 for driving them in the opposite direction. It also includes an off position in which fluid is supplied to neither port. In the preferred embodiment, the valve 146 is electrically activated and is ganged with a valve 147 which controls the flow of water to the spray manifolds of the rinsing means. These valves are interconnected in such manner that when the conveyor belt is moving in the forward direction, that is carrying circuit boards from the sink to the rinsing and drying means, the rinse water is turned on, and when the belt moves in the opposite direction, the water is turned off.

A brush control valve 151 is provided for adjusting the vertical position of the scrubbing brushes 61. This valve is connected for receiving fluid from the pump 142 and delivering it to either of a pair of hydraulic lines 152, 153. The hydraulic ram 81 includes an upper chamber or cylinder **81*a* and lower chamber or cylinder 81*b*, separated by a vertically movable piston assembly 81*c*. This piston assembly is connected to the cross arm 53 of the brush carrier assembly. The lower chamber 81*b* is in fluid communication with the line 153, and when fluid is supplied to this line, it lifts the piston 81*c*, raising the brushes. When fluid is supplied to the line 152, it passes through a pressure regulating valve 154 and a hydraulic line 156 to the upper chamber 81*a*, urging the piston and brushes down. The valve 154 provides means for regulating the amount of pressure with which the brushes are urged down against the circuit boards. A pressure gage 157 is provided for monitoring the pressure in the line 156. It should be noted that the pressure which the brushes exert upon the circuit boards remains at the constant level set by the valve 154** regardless of irregularities in the thickness of the boards and regardless of brush wear.

Controls for the motor control valve 146, the brush control valve 151, and the pressure regulating valve 154 are conveniently mounted on a control panel mounted on the front side of the chassis 21.

A solenoid operated valve 161 is provided for controlling the operation of the reciprocating hydraulic ram or motor 82 which drives the scrub brushes. This valve is connected for receiving fluid from the pump 142 and delivering it to hydraulic lines 162, 163 in accordance with the position of the operating piston **82*a* in the ram or motor 82. Means is provided for sensing the position of the piston 82*a* and controlling the valve 161 in response thereto. This means includes a magnetically operated reed switch located toward each end of the ram housing. One of these reed switches is connected to a pair of terminals 166, 167, and the other is connected to terminals 168, 169. A magnet is carried by the piston 82*a* and produces a magnetic field which closes the reed switches when proximate thereto. The terminals 167 and 169 are connected together to a terminal 171 for connection to a source of electrical energy. The terminals 166 and 168 are connected by leads 172 and 173, respectively, to solenoids in the valve 161. The ram or motor 82 includes a left chamber or cylinder 81*b* and a right chamber or cylinder 81*c* separated by the movable piston 82*a*. The left and right chambers are in fluid communication with the lines 163, 162, respectively. When the piston is toward the right extreme of its travel, as indicated, the reed switch connected to the terminals 168 and 169 is closed, energizing the solenoid connected to the lead 173. This causes fluid to be supplied to the line 162 and right chamber, urging the piston toward the left. When the piston approaches the left extremity of its travel, the reed switch connected between the terminals 166 and 167 closes, energizing the other solenoid of the valve 161. This causes fluid to be delivered to the left chamber 82b**, urging the piston back toward the right.

Operation and use of the scrubbing machine can now be described briefly. Let it be assumed that all necessary electrical and plumbing connections have been made to the machine. Circuit boards to be cleaned are placed on the upper surface of the conveyor belt 26, and suitable soap is sprinkled over them. This may be any of the readily available soaps made specifically for cleaning printed circuit boards. The boards are carried by the conveyor belt beneath the scrubbing brushes 61. These brushes reciprocate along an arcuate path in a direction generally perpendicular to the direction of travel of the belt. The force with which the brushes press down upon the boards is maintained at a constant level by the ram 81. After passing beneath the brushes, the boards are carried on the conveyor belt to the rinsing station 16 where their upper and lower surfaces are rinsed with water from the nozzles 109. The boards then pass between the vertically disposed pairs of rollers 111 and dried by the blotting action of the terry cloth wrapping on the rollers. Finally, the boards pass the air manifold 121 where they are further dried by warm air and emerged through the opening **23*b* in the cover 23**.

Since the direction of the conveyor belt is reversible, the boards can be passed under the brushes any desired number of times simply by reversing the direction of travel. When the boards are moving toward the sink from the rinsing means, the rinse water supply is turned off since no boards will be delivered for rinsing.

The hold-down rollers 91 and 93 provide means for automatically feeding boards through the machine individually from a stack of boards placed upon the conveyor belt 26. Thus, as illustrated in FIG. 1, a stack of boards **29*a* can be placed on the input side of the belt. The belt carries the stack as a unit until it reaches the hold-down roller 91. At this point, the belt draws the lower most board from the stack, feeding beneath the hold-down roller 91 to the scrubbing brushes. While this board is still partially beneath the stack 29*a*, the leading edges of the remaining boards in the stack engage the roller 91, preventing it from rotating. This causes the roller to slide on the top surface of the board feeding under it and prevents the next board in the stack from being drawn prematurely. When the first board is completely clear of the stack, the next board drops flat on the top surface of the belt and is fed in the same manner as the first board. This process continues until all of the boards in the stack have been fed. When the belt travels in the direction opposite to that indicated by the arrows in FIG. 1, the stack 29 can be placed on the belt between the scrubbing and rinsing stations, in which case the hold-down roller 93 functions in the above manner. If desired, the rollers 91 and 93** can be locked against rotational movement during the automatic feeding mode of operation.

According to the method of the present invention, printed circuit boards are conveyed in a first direction of travel and scrubbed by means of reciprocating brushes moving in an orbital or arcuate path in a direction generally perpendicular to the direction in which the boards are conveyed. The pressure exerted upon the boards by the brushes is regulated hydraulically to provide a constant pressure regardless of board thickness or brush wear. The method also includes the steps of rinsing the boards after scrubbing and drying them by blotting and exposure to warm warm air. The boards can be placed on the conveyor either individually or in a stack, the boards in the stack being automatically fed to the scrubbing brushes individually.

It is apparent from the foregoing that a new and improved machine and method have been provided for scrubbing printed circuit boards. While only one presently preferred embodiment of the invention has been described herein, as will be apparent to those familiar with the art, certain changes and modifications can be made without departing from the scope of the invention as defined by the following claims.

I claim:

1. In a machine for scrubbing printed circuit boards, conveyor means movable in a first direction and adapted for carrying printed circuit boards, elongated brush means extending transversely of said first direction and proximate to said conveyor means for scrubbing circuit boards carried by said conveyor means, means pivotally mounting the ends of said brush means for arcuate movement about spaced apart parallel axes normal to said first direction, and reciprocating drive means operably connected to said brush means for moving said brush means transversely of said first direction.

2. A machine as in claim 1 wherein said drive means is fluid operated.

3. A machine as in claim 1 wherein said conveyor means is movable in a second direction opposite to said first direction, together with means for selectively moving said conveyor means in said first and second directions.

4. A machine as in claim 1 together with a fluid operated ram operably connected to said brush means for urging said brush means into contact with circuit boards carried by said conveyor means and a pressure regulating valve connected for controlling the flow of fluid to said ram.

5. A machine as in claim 1 wherein said conveyor means comprises an endless conveyor belt having a textured surface for gripping printed circuit boards carried thereon.

6. A machine as in claim 5 together with means cooperating with said conveyor belt for feeding boards from a stack placed on said belt individually to said brush means, said means for feeding comprising a cylindrical roller mounted for rotation about an axis generally parallel to said brush means, said roller being spaced above said belt by a distance corresponding to the thickness of a circuit board.

7. In a machine for scrubbing printed circuit boards, a frame assembly, a conveyor means including an endless belt mounted on said frame assembly and movable in a first direction of travel, said belt being adapted for carrying printed circuit boards on its upper surface, elongated brush means extending transversely of the direction of belt travel, said brush means having a bristle portion disposed for engaging the upper surfaces of printed circuit boards carried by the belt, a pair of spaced apart spindle members carried by the frame assembly and extending in a direction normal to the upper surface of the belt, means constraining the ends of said brush means for arcuate movement about said spindle members, reciprocating drive means operably connected to said brush means for moving the same transversely of the belt travel, drying means mounted on said frame assembly at one end of the conveyor means for receiving printed circuit boards from said belt and drying said boards, and rinsing means mounted on said frame assembly intermediate the conveyor belt and said drying means for rinsing the printed circuit boards as they pass from said belt to said drying means.

8. A machine as in claim 7 wherein said drying means includes a plurality of rollers disposed in pairs and adapted for passing printed circuit boards between the rollers of each pair, one roller in each pair having moisture absorbent material at its periphery, said drying means also including means for directing warm air against the boards.

9. A machine as in claim 7 together with a washing sink disposed at the end of the conveyor means opposite said drying means.

10. A machine as in claim 7 together with fluid actuated ram means carried by the frame assembly for urging the brush means into contact with printed circuit boards carried by the conveyor belt and means for maintaining the pressure of fluid delivered to the ram means at a predetermined level.

11. A machine as in claim 7 together with means for feeding circuit boards individually along the belt toward the brush means from a stack of boards on the belt, said means comprising a cylindrical roller mounted for rotation about an axis extending transversely of the direction of belt travel, said roller being spaced above the upper surface of the belt by a distance corresponding to the thickness of a circuit board.

* * * * *